UNITED STATES PATENT OFFICE.

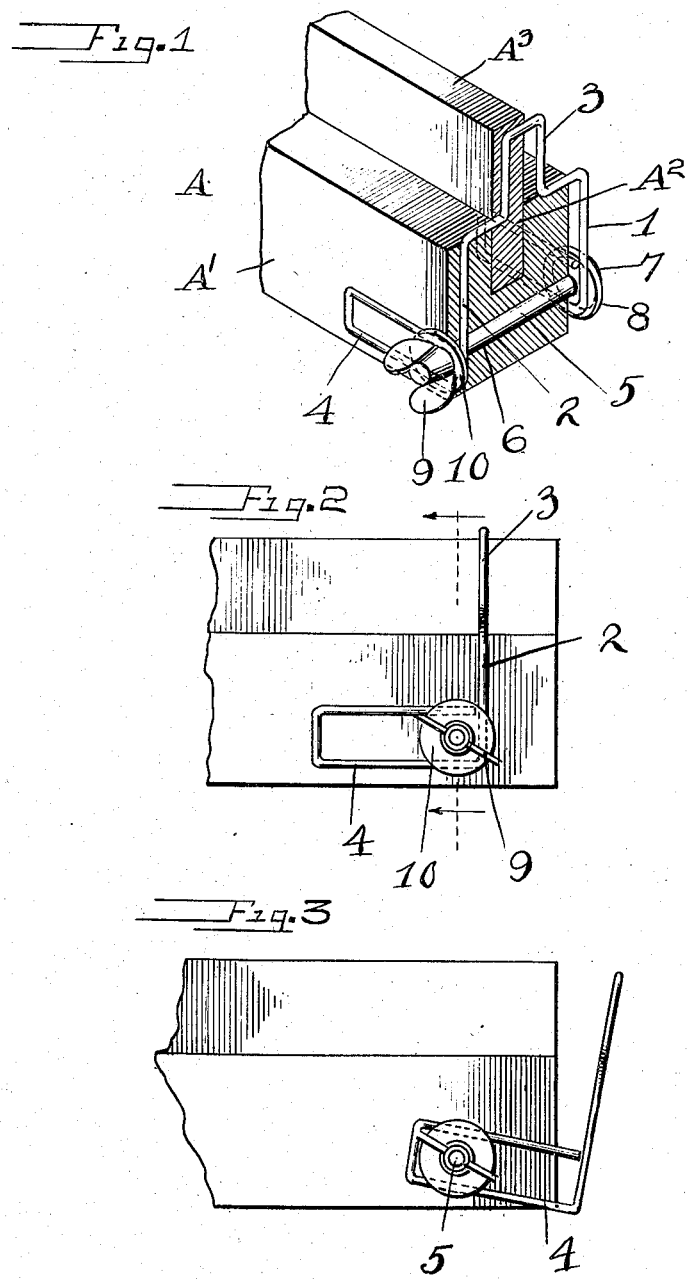

JOSEPH BEGINS, OF BRUNSWICK, MAINE, ASSIGNOR TO BARBER-COLMAN COMPANY, OF ROCKFORD, ILLINOIS, A CORPORATION OF ILLINOIS.

LOCKING DEVICE FOR CLAMPS.

942,239.      Specification of Letters Patent.      Patented Dec. 7, 1909.

Application filed April 20, 1907. Serial No. 369,389.

*To all whom it may concern:*

Be it known that I, JOSEPH BEGINS, a citizen of the United States, residing at Brunswick, in the county of Cumberland and State of Maine, have invented certain new and useful Improvements in Locking Devices for Clamps, of which the following is a specification.

The object of this invention is to provide a simple, convenient, and efficient device for locking a clamp in the closed or operative position.

I shall herein describe my invention as applied to a tongue clamp of the form commonly employed in textile mills for holding warp threads.

In the accompanying drawings Figure 1 is a fragmental perspective view of a tongue clamp provided with a locking device embodying the features of my invention. Fig. 2 is a side elevation of said parts showing the locking device in the operative position. Fig. 3 is a view similar to that of Fig. 2, but showing the locking device in inoperative position.

The tongue clamp A comprises a bar $A^1$ having a groove $A^2$ therein, and a tongue piece $A^3$ adapted to fit into the groove $A^2$. For locking the tongue piece in place in said groove I provide at each end of the clamp a locking device comprising a bail 1 which may be made of wire and which is preferably shaped to conform to the parts with which it is to engage. In the present embodiment said bail comprises a body portion 2 adapted to fit over the grooved bar $A^1$ and a narrow loop 3 adapted to fit over the tongue piece $A^3$. Preferably integral with each of the arms of the bail 1 is an elongated loop 4 through which extends a screw bolt 5, said bolt passing through an opening 6 in the grooved bar $A^1$. The head 7 of said bolt or a washer 8 beneath said head bears against one of the loops 4 at one side of the grooved bar $A^1$, and a thumb nut 9 turned upon said bolt provides means for clamping said loops 4 and consequently the bail 1 firmly to the bar $A^1$. A washer 10 may be placed between the nut 9 and the adjacent loop 4.

When the bail 1 is placed in the position indicated in Fig. 2 and the wing nut 9 tightened up, the tongue piece $A^3$ is locked against withdrawal from the groove $A^2$. When it is desired to open the clamp, the wing nut 9 is rotated to free the bail 1. The latter is then slipped off the end of the grooved bar $A^1$ and tongue piece $A^3$ by the operator, the parts assuming substantially the position indicated in Fig. 3. The tongue piece $A^3$ may now be withdrawn from the groove $A^2$. The loops 4 being closed, the locking bail 1 is always attached to the clamp in readiness to be slipped over the parts of said clamp when it is desired again to lock the clamp in operative position.

It is evident that various changes may be made in the embodiment herein shown without departing from the spirit and scope of my invention, therefore no undue limitation should be understood from the foregoing detailed description.

I claim as my invention:

1. A clamp having a bail pivotally and slidably attached thereto, and means for securing said bail against movement with relation to the clamp.

2. A clamp provided with a locking device consisting of a portion adapted to fit over the sections of the clamp, said portion having an elongated loop thereon, and means extending through said loop for clamping said portion to the clamp.

3. A clamp provided with a locking means consisting of a member adapted to fit over the sections of the clamp, said member having two elongated loops thereon, and a bolt extending through one of the clamp-sections and through said elongated loops for securing said member to the clamp.

4. A clamp provided with a locking means consisting of a bail formed from wire and adapted to fit over and conforming to the clamp sections, said bail having an elongated loop at each side thereof adapted to lie at opposite sides of one of the clamp-sections, a bolt extending through said clamp section and through said elongated loops, and a clamp nut on said bolt.

JOSEPH BEGINS.

Witnesses:
RUSSELL W. EATON,
CHARLES A. COGGESHALL.